Figure 1:
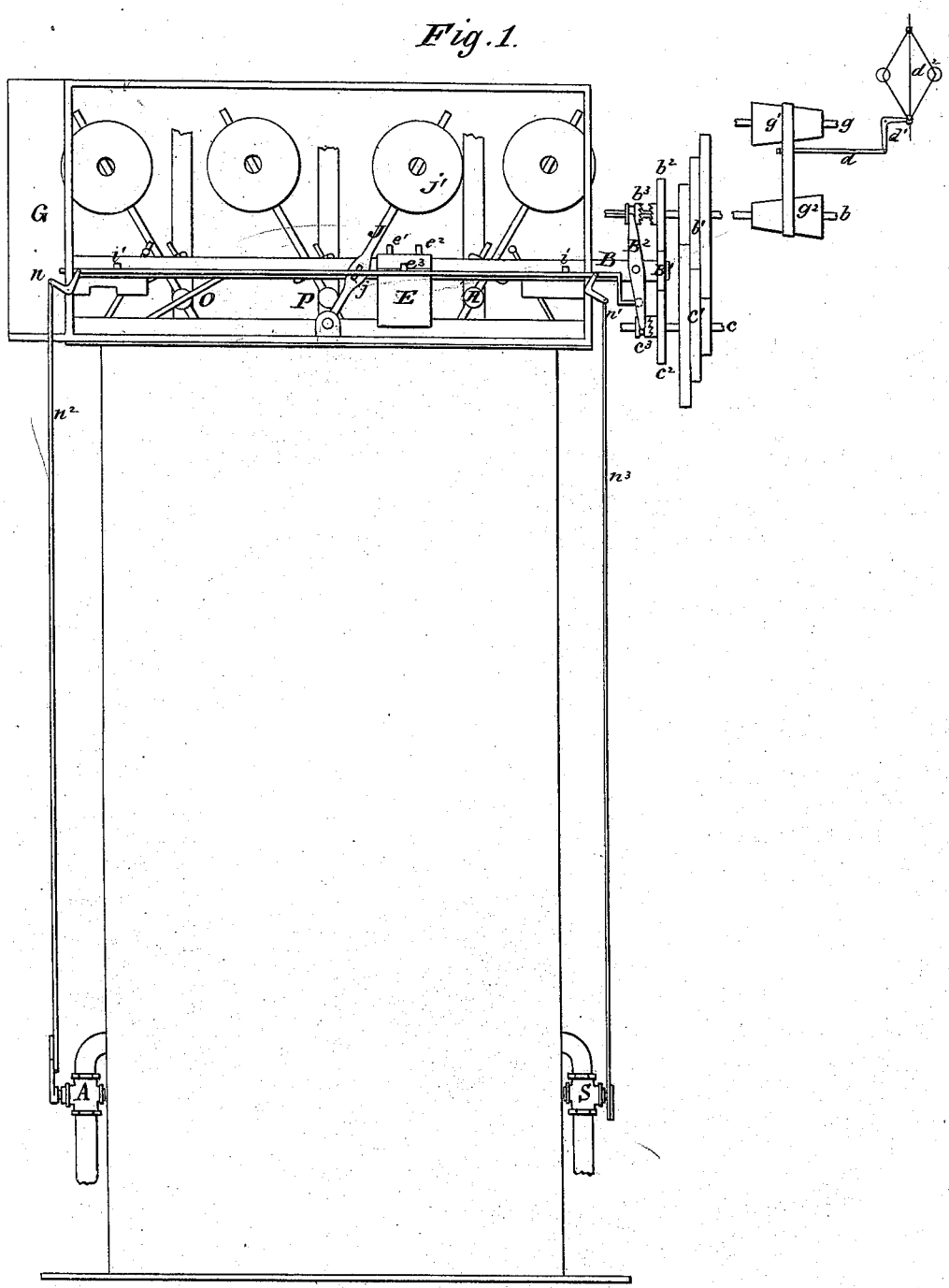

E. STERN.
PROCESS AND APPARATUS FOR THE MANUFACTURE OF GAS.
No. 177,767. Patented May 23, 1876.

5 Sheets—Sheet 2.

E. STERN.
PROCESS AND APPARATUS FOR THE MANUFACTURE OF GAS.
No. 177,767. Patented May 23, 1876.

Witnesses:
W. B. Masson
D. H. Howe

Inventor:
Edward Stern
by E. E. Masson
atty

5 Sheets—Sheet 3.
E. STERN.
PROCESS AND APPARATUS FOR THE MANUFACTURE OF GAS.
No. 177,767. Patented May 23, 1876.
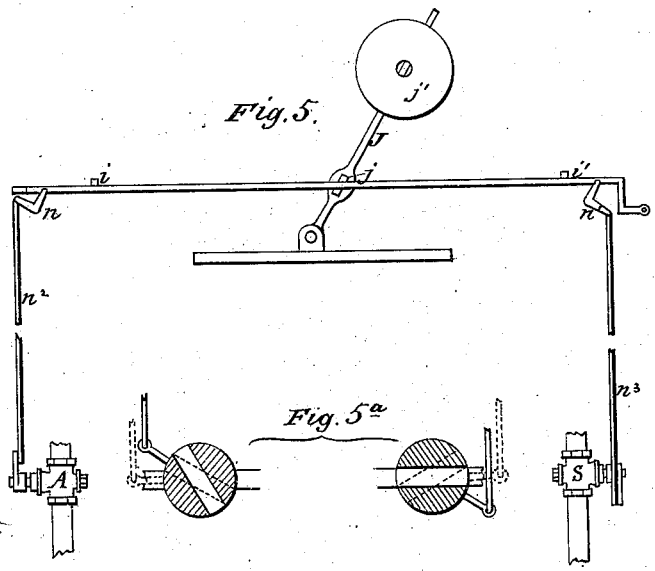
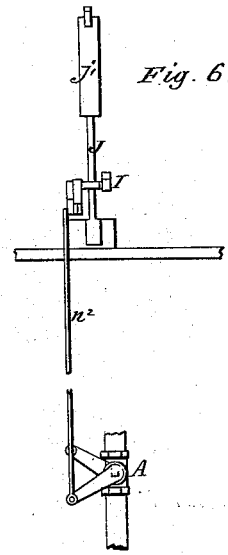
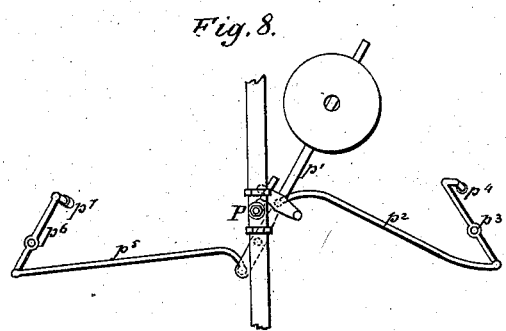
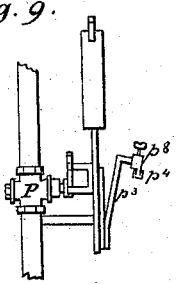
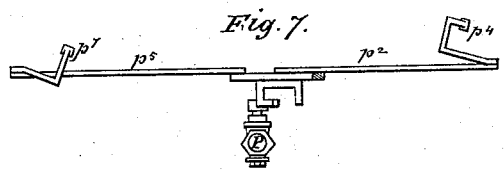
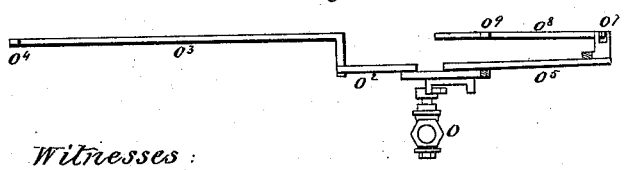
Witnesses:
W. B. Masson
D. P. Cowe
Inventor:
Edward Stern
by E. E. Masson
atty
N. PETERS, PHOTO-LITHOGRAPHER, WASHINGTON, D. C.

5 Sheets—Sheet 4

E. STERN.
PROCESS AND APPARATUS FOR THE MANUFACTURE OF GAS.

No. 177,767. Patented May 23, 1876.

Witnesses:
W. B. Masson
D. P. Howe

Inventor.
Edward Stern
by E. E. Masson
atty

E. STERN.
PROCESS AND APPARATUS FOR THE MANUFACTURE OF GAS.
No. 177,767. Patented May 23, 1876.
Fig. 18.
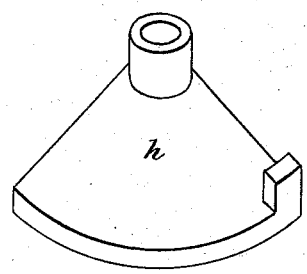
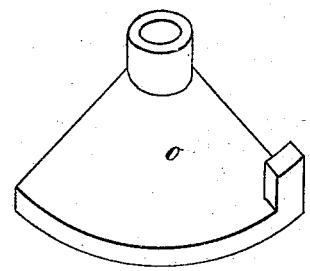
Fig. 19.  Fig. 20.
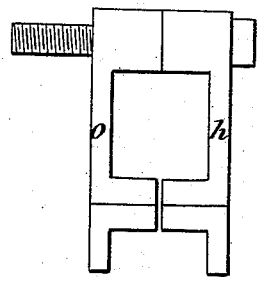
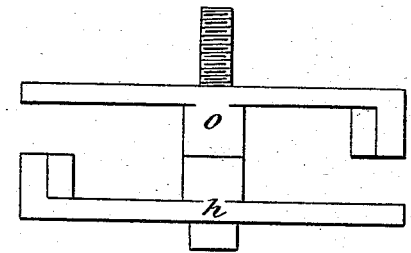
Fig. 21.  Fig. 22.
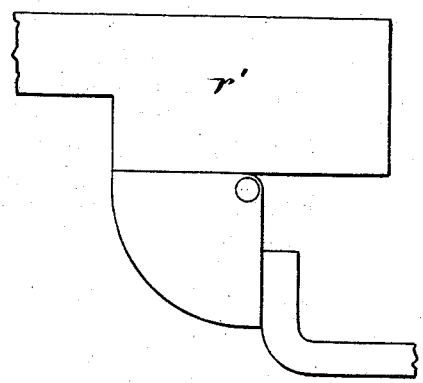
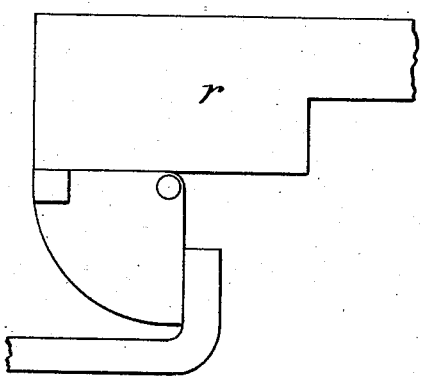
Witnesses:
W. B. Masson
D. P. Cowl
Inventor:
Edward Stern
by E. E. Masson
atty

UNITED STATES PATENT OFFICE

EDWARD STERN, OF NEW YORK, N. Y.

IMPROVEMENT IN PROCESSES AND APPARATUS FOR THE MANUFACTURE OF GAS.

Specification forming part of Letters Patent No. 177,767, dated May 23, 1876; application filed April 19, 1876.

*To all whom it may concern:*

Be it known that I, EDWARD STERN, of the city, county, and State of New York, have invented a new and useful Improvement in the Manufacture of Gases for Heating, Illumination, and other purposes; and that the following is a description of my said improvement, reference being had to the accompanying drawings.

In the manufacture of what is commonly called "water-gas," by causing air and steam alternately to flow through a mass of ignited coke, or other suitable carbonaceous matter, in a generating-chamber, the flow of air is for the purpose of stimulating the combustion of the fuel until its temperature and that of the chamber are raised so high that when the air is shut off and the steam is admitted such chemical reactions between the steam and incandescent fuel will be established, and for some time maintained, as will produce a large volume of hydrogen; but as the temperature of the coke and chamber is gradually reduced during the decomposition of the steam, its flow must at intervals be shut off, and air admitted to re-invigorate the combustion and restore the elevated temperature required to re-establish the desired reactions between the steam and the incandescent fuel.

The gases produced by the reactions which take place in the generator while the air is flowing through it are chiefly carbonic oxide, nitrogen, and carbonic acid, with small proportions of others. These gases collectively are herein called "air-gas." The reactions which take place during the flow of the steam produce, chiefly, hydrogen, mixed with carbonic oxide and a small proportion of other gases, and these gases collectively are herein called "water-gas."

While causing the air to flow into the generator at frequent intervals to maintain the great intensity of heat required, the chamber is, with corresponding frequency, left full of air-gas, which heretofore has been suffered to remain and mingle with the water-gas, with the effect of both diluting it and contaminating it with nitrogen. To prevent such dilution and contamination of the water-gas is one of the objects of my invention; and it is best accomplished by the sudden removal of the air-gas from the generating-chamber immediately after the flow of air is shut off and the steam admitted, and before the communication between the chamber and the holder of the water-gas is opened.

When air and steam are introduced in alternation into the generator, under the conditions heretofore obtained, the air and water gases have time to mingle and form explosive compounds, whose frequent detonations disintegrate the brick lining, disturb the regular action of the generator, render attendance upon the apparatus by workmen dangerous, and produce many other difficulties, which I have either avoided altogether, or reduced to such insignificant proportions as to render them no longer of importance, by introducing the air and the steam when an escape-valve for the gas is open, that the expansive force with which each enters the generating-chamber, re-enforced by that of the rapidly-generating gases, will suddenly displace and drive out before it the gas then in the chamber through the escape-valve at the top before the two gases have time to intermingle to an extent sufficient to produce an explosive compound in dangerous quantity. The small quantity of explosive gas, which is produced and exploded at the instant of contact of the two gases, forms a partition or medium of neutral gas between the entering and discharging gases, which hinders their further mingling, and is also advantageous in intensifying the entering puff, and thus accelerating the displacement of the gas already in the chamber. The displacement might be accelerated by opening the discharge-pipe into a vacuum-chamber, or by having a steam-jet in the discharge-pipe; and either of these methods, even unaided by the force of the entering gases, would, in a large degree, cleanse the chamber, but not as effectually as by the complete purging by displacement, which I have particularly described herein.

It is obvious that emptying the chamber of one gas while filling it with another might be effected by many different methods and apparatus; but I prefer having a large valve at the top of the chamber, opened for the escape of the gas to be driven out by the gas which is to supersede it, this escape-valve to be instantly shut when the substitution is complete.

This process of driving out of the chamber of one gas by occupying it with another is herein called "purging," and the escape-valve in the top of the chamber is called the "purge-valve."

This purging process is effective for the prevention of explosions, and also for the prevention of contamination of the water-gas by the air-gas. There is, however, another source of contamination of the water-gas, and it is the unavoidable production, under the conditions of working heretofore practiced, of a considerable quantity of carbonic acid—sometimes because of irregularity in the times and quantities of fuel fed at short intervals into the chamber; sometimes because of stopping the flow of air too soon, and so starting the flow of steam with insufficient heat in the chamber to maintain its temperature above the point of producing carbonic acid; and sometimes because the steam is not shut off soon enough to prevent undue cooling of the chamber.

Such irregularities of working it has been impracticable to prevent while the feeding of fuel at short intervals, and the opening and closing of the valves of the generating-chamber, depended upon the care and attention of a workman. I have, therefore, sought, by another branch of my invention, to dispense with the manual feeding of the fuel into the chamber by fitting it with a feeding-hopper that supplies the fuel constantly in proportion to the consumption, this hopper only requiring replenishment at long and stated intervals—say, four, six, or eight times a day.

By a third branch of my invention I have thought to dispense with the manual working of the valves of the generator, and to this end have devised an automatic machine which works them with the regularity required to maintain the conditions necessary to producing water-gas of the greatest purity and at the least cost.

The conditions of working which I have found to be effective for the economical production of water-gas of excellent quality are, first, a generating-chamber of refractory brick, with its bottom so shaped as to afford adequate support for the coke, and at the same time leave a large part of its under surface uncovered, to permit the free dropping of ashes, and to allow the air and the steam to distribute themselves and freely enter the interstitial spaces in the lower portion of the mass of coke; second, keeping the chamber full of coke, that the incandescent mass may be of uniform thickness, and so react upon the air and steam passing through it with greater regularity; third, regulating the pressure of the air and steam which enter the chamber, so as to maintain a substantially even flow; fourth, regulating the heating of the air and steam, so as to deliver them in the chamber at a substantially even temperature, but they should be as hot as it is practicable and convenient to make them; fifth, discharging the gases from the chamber under regular conditions as to the opening and closing of the valves, and the pressure behind and before them; sixth, working the valves with regularity, by which air and steam are admitted and the generating-chamber purged; seventh, avoiding dangerous or troublesome explosions in the generating-chamber, and the open recesses and pipes appurtenant to it, by purging, as herein set forth, and at the same time securing greater purity in the water-gas; eighth, with air and steam both heated to a temperature of 600° Fahrenheit, the air may be permitted to flow about ten minutes into the generating-chamber, then stopped, and the steam to flow in the same length of time, these terms being adapted to maintaining the necessary heat in a generator duly charged, and capable of holding three-quarters of a ton of the best coke. With a larger or smaller generator, and different temperature of air and steam, the best relative as well as absolute times for the flow of steam and air would be different, but only determinable by practice.

One form of automatic machine which I have devised and constructed for opening and closing the valves, to admit air and steam and purge the generating-chamber at regulated intervals, is represented in the drawing, of which—

Figure 2:
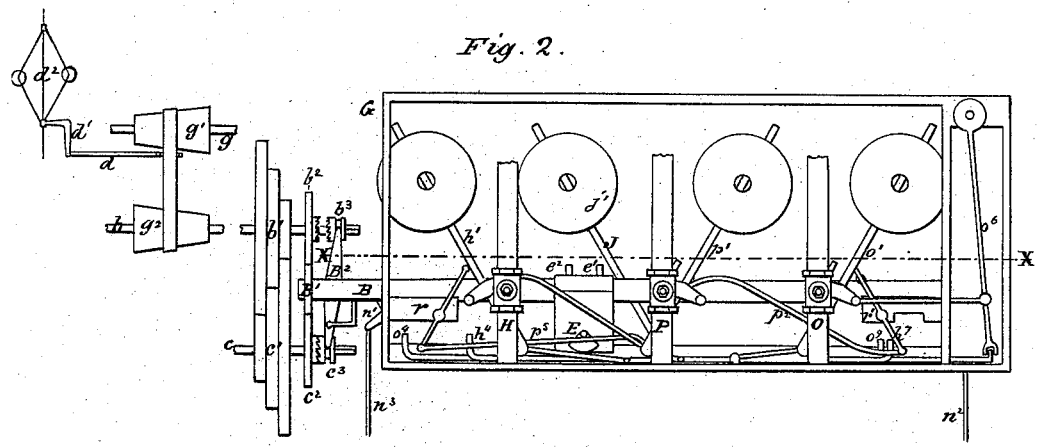
Figure 3:
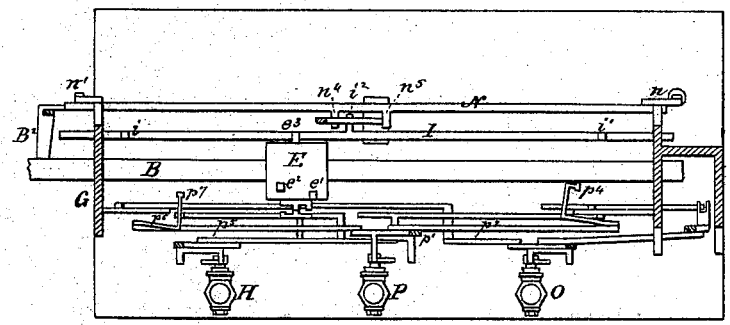

Figure 1 shows a side elevation, in connection with an end elevation of the generator upon which the machine is mounted. Fig. 2 represents an elevation of the opposite side of the machine without the generator. Fig. 3 represents the machine in plan below the section-plane X X of Fig. 2.

Figure 4:
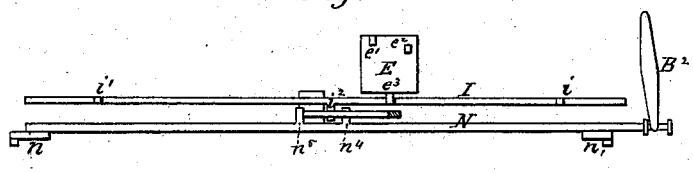
Figure 11:
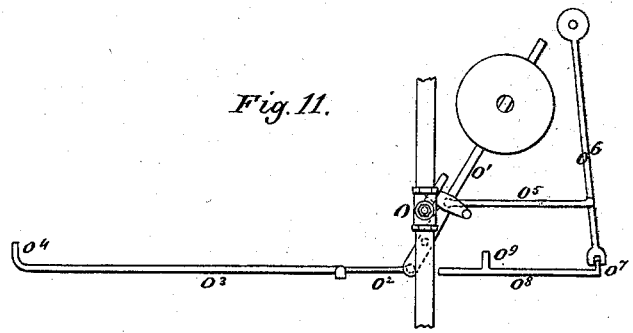
Figure 12:
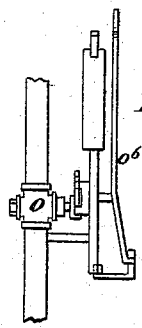
Figure 13:
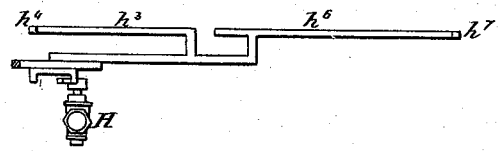
Figure 14:
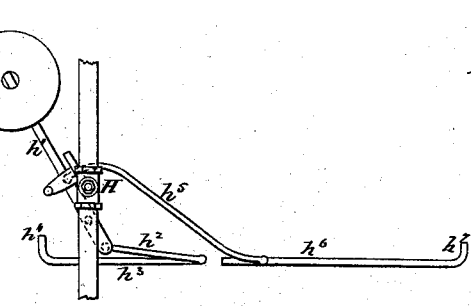
Figure 15:
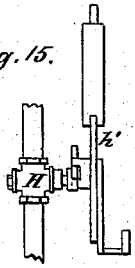
Figure 16:
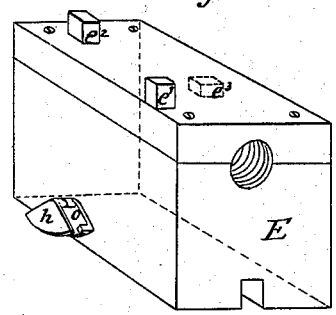
Figure 17:
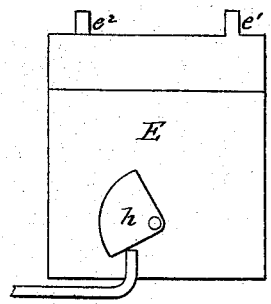

The details of the movement of the valves for admitting air and steam alternately to the generating-chamber are represented in plan in Fig. 4, in side elevation in Fig. 5, and in end elevation in Fig. 6. Fig. 5$^a$ represents, on an enlarged scale and in cross-section, the air and steam valves detached from their seats, but showing the parts of the valves and the outlines of the parts in the seats. The details of the movement of the valve for purging the chamber are represented in like views in Figs. 7, 8, and 9. The details of the movement of the valve for the discharge of the air-gas from the chamber are represented in like views in Figs. 10, 11, and 12; and the details of the movement of the valve for the discharge of water-gas are represented in like views in Figs. 13, 14, and 15. The traversing tripper and its details are shown in sundry views in Figs. 16, 17, 18, 19, 20, 21, and 22.

The valves shown in the drawing are of the rotating-cylinder variety, like those of an ordinary stop-cock; but slide, puppet, or other valves may be used, as the engineer constructing the apparatus may prefer.

In all these figures the same letters of reference indicate the same parts.

I have employed, as a convenient means of regulating the time and applying the force to work the valve movements, a revolving screw, which is turned in one direction during the time which the air flows, and in the opposite direction during the time which the steam flows, into the generator, traversing back and forth through its whole length a nut connected with a small carriage. This carriage is herein called the "tripper," and it bears certain tappets—some rigid and some hinged. Those tappets are for the purpose of turning and tripping, at and near the beginning and end of the reciprocating motions of the tripper, certain weighted levers, which, on turning past their centers of support by gravitation, suddenly act with force to open and close, at the proper times, the valves of the generating-chamber, and also to shift the clutch of the reversing-gear, by which, when the screw has moved the tripper the full length of its stroke in one direction, its motion will be reversed to send the tripper back the full length of its stroke in the opposite direction. The valves are opened and closed while the tripper is about terminating a stroke in one direction and beginning one in the opposite direction, and continue opened or closed, as the case may be, during the time the tripper is slowly carried by the screw the length of its stroke, except the purge-valve, which is only momentarily held open. In this way the time is measured during which the air, steam, and gas valves are alternately kept open and shut, and the air and steam alternately kept flowing into the generating-chamber.

The steam-engine, or other prime mover which drives the blowers and exhausters of the works, will furnish the small amount of power required to turn the revolving screw to work this automaton.

It is important that the engine should be fitted with a governor that will keep its speed regular. If this, for any reason, should be impracticable, then the automatic valve-worker must be fitted with some equalizer of speed, as a pair of reversed cone-pulleys encircled by a belt, which is connected by a shifter with a governor, that will shift the belt toward the large or the small end of the driving-pulley, and the reverse end of the driven pulley, as may be required to keep the latter turning at a substantially constant rate of speed. Such regulated speed is necessary to cause the steam and air to be supplied with corresponding regularity, which is essential to secure uniformity in the quality and quantity of the gas product so far as the same may depend on the opening and closing of the valves punctually in the predetermined order of succession and intervals of time.

In Figs. 1, 2, and 3, the mechanism for working the valves is represented as supported on a frame, G, placed on the generator, which is shown in outline; but the machine would be better placed upon a frame far enough above the generator not to interfere with free access to the valves or pipes, or the filling of the hoppers with fuel. This gearing-frame carries a driving-shaft, $g$, which takes motion from a steam-engine or other motor. This shaft is fitted with a cone-pulley, its counter-pulley $g^2$ being on a shaft, $b$. A belt encircling these pulleys is connected, by a shifting-rod, $d$, with a governor, $d^2$, which, when the steam-engine's speed increases, will turn the bell-crank $d^1$ and shift the belt to a smaller part of the pulley $g^1$, and, when the speed of the engine slackens, will move it to a larger part of the pulley $g^1$, thus compensating inequalities in the speed of the driving-engine, and giving to the shaft $b$ practically an equal motion.

The shaft $b$ is fitted with a cone of cog-wheels, $b^1$, any one of which may, from time to time, be connected, by a set-screw or a shifting feather, with the shaft, the others being left loose on the shaft. A corresponding cone of cog-wheels, $c^1$, is mounted on the shaft $c$ and keyed fast thereto. The teeth of the wheels of these two cones are in gear with each other, and two opposite wheels are always engaged, one of which is the wheel held by the screw or feather to the shaft $b$. By this means the speed of the two shafts $b$ and $c$ can, at will, be made equal, or either can be made to turn faster than the other. These shafts are alternately connected with and rotate the shaft B, one turning it to the right and the other to the left; one therefore moves the reciprocating tripper on its right-hand stroke, the other on its left, so that the tripper will move in equal times on both strokes, or on either faster than the other, as the relative speed of the shafts $b$ and $c$ may be adjusted by their connections with the cone-wheels.

The shaft $b$ carries a loose spur-wheel, $b^2$, and the shaft $c$ a like spur-wheel, $c^2$. These two wheels gear into a common pinion, B$^1$, fixed on the screw-shaft B. A ratchet-clutch, $b^3$, is fitted to the shaft $b$ and the wheel $b^2$, and a like clutch, $c^3$, is fitted to the shaft $c$ and the wheel $c^2$. The moving jaws of these clutches are connected with the opposite ends of a lever, B$^2$, pivoted at its middle to the frame of the machine, so that while one clutch is engaged to connect its wheel rigidly with its shaft, the other clutch is disengaged from its wheel, and the latter is left at liberty to turn loosely on its shaft. In this way the wheels $b^2$ and $c^2$ become alternately the drivers of the pinion B$^1$, which turns the screw B.

When the tripper E, moving toward the right, reaches the end of its stroke, it trips a weighted lever, which throws the lever B$^2$ suddenly round to engage the clutch $b^3$, thus instantly reversing the motion of the screw and starting the tripper off on another stroke back to the left. When the tripper reaches the opposite end of its stroke it again trips the weighted lever in the opposite direction, which turns the lever B$^2$, disengages the clutch $c^3$, engages the clutch $b^3$, reverses the motion of the screw, and starts the tripper back again on its right stroke.

The duties which the tripper performs just as it approaches the end of its stroke toward the right are, first, to close the air-valve A; second, to close the air-gas valve O; third, to open the steam-valve S; fourth, to open the purge-valve P; fifth, to disengage the clutch $b^3$ and engage the clutch $c^3$ by turning the lever $B^2$—these five operations being simultaneously completed just as the tripper is about to stop at the end of the stroke, in such manner that the valves to be closed are shut before those to be unclosed are opened. Next, the tripper, commencing its reverse or left-hand stroke, which it does instantly after it has advanced a short distance to the left, to give the inflowing steam a moment, say from ten to thirty seconds, or more or less, as may be necessary, (depending upon the size of the generator and the purge-valve, and the adjustment of the tappets and other tripping mechanism,) to displace and drive out before it, through the purge-valve P, the air-gas remaining in the generator when the air-valve was shut, shuts the purging-valve P and opens the water-gas valve H, and continuing on its course for ten minutes, more or less, according to the regulation of the time adjustment, the tripper reaches the terminus of its left stroke, and shuts the steam-valve S, shuts the water-gas valve H, opens the air-valve A, opens the purge-valve P, disengages the clutch $c^3$, and engages the clutch $b^3$ by shifting the clutch-lever $B^2$—these several operations being also so disposed that the valves to be shut are closed before those to be unclosed are opened, just as the tripper is about to stop at the end of the stroke. Next, the tripper, commencing its right stroke, advances a moment to let the inflowing air drive the residual water-gas out of the generating-chamber, then shuts the purge-valve P, opens the air-gas valve O, and moving along in its course for ten minutes, more or less, according to the regulation of the time adjustment, the tripper reaches the end of its right stroke, and repeats at that end the operations already described. This is the round of duties which the tripper performs with ceaseless repetition while the generator is at work.

The left stroke of the tripper, during which the steam flows into the generator, will hereinafter be called the "steam-stroke," and the right stroke, during which the air flows into the generator, will be called the "air-stroke." The screw B should be preferably made of steel, and of the strength required to do the work. A screw of an inch and a half diameter, with a thread of rectangular cross-section and a quarter-inch pitch, with a length that will give the tripper E a traversing motion of forty inches, and a speed of rotation that will give a full stroke to the tripper every ten minutes, I have found to be well adapted to working the valves of a generating-chamber capable of producing one hundred thousand cubic feet of water-gas in twenty-four hours.

The tripper E, as represented in the drawing, consists of a block of brass, with a female screw extending through it that fits the screw B. The block is in two pieces, held together by screws, and its lower portion has a groove formed in it to fit a rail lying below and parallel with the screw. The tripper slides along this rail to steady its motion, and prevent it from rotating with the screw. On the side of the tripper a tappet, $e^3$, is fixed, which projects over a sliding bar, I, carrying two studs, $i$ and $i^1$. As the tripper traverses the screw B back and forth, when near the ends of its strokes, it brings the tappet against the studs, so as to slide the bar I in alternate opposite directions. The bar I carries a tappet, $i^2$, on its side, which projects into a slot, $j$, in the oscillating lever J, having a weight, $j'$, on its upper end, which, by gravitation, causes the lever to fall suddenly on whichever side of its pivot the weight may preponderate. By the side of the sliding bar I another sliding bar, N, is arranged. This bar is connected to the lever $B^2$, which operates the clutches $b^3$ and $c^3$. It is also pivoted to the bell-cranks $n$ $n^1$, one of which, $n$, is connected, by a link-rod, $n^2$, with the air-valve A, and the other, $n^1$, is connected, by the link-rod $n^3$, with the steam-valve S. These valves, respectively, open and close the pipes which supply the generating-chamber with air and steam, and are connected, as represented, by means of link-rods, bell-cranks, and the bar N, in such manner that when the bar is moved endwise in one direction it will open the air-valve, close the steam-valve, and shift the reversing-clutch, and when so moved in the opposite direction it will close the air-valve, open the steam-valve, and shift back the reversing-clutch. Such endwise movements are given to the bar N by the alternate falling of the lever J to the right and to the left. When the tripper is approaching near the end of its steam-stroke its tappet $e^3$ is brought into contact with the stud $i$, and, pushing it forward, draws with it the bar I, which, by its tappet $i^2$, bears against and turns the lever J up to and just beyond the perpendicular, when the preponderance of the weight $j'$ causes the lever suddenly to fall in the direction in which the bar I was moved, and, while falling, to push before it the stud $n^4$ and the bar N, from which it projects. This movement of the bar N turns the lever $B^2$, to which it is pivoted, to detach one of its clutches, and engage the other to reverse the rotation of the screw B. This movement of the bar N also turns the bell-cranks $n$ and $n^1$, to which it is also pivoted, to open the steam-valve S and close the air-valve A.

When the tripper returns, and has nearly completed its steam-stroke, its tappet, bearing against the stud $i$, reverses the motion of the lever J, and, bearing against the stud $n^5$ on the bar N, slides the bar, reverses the clutch-lever $B^2$, opens the air-valve A, and shuts the steam-valve S.

The air and steam valves (see Fig. $5^a$) are constructed with what, in steam-engineering, is termed a "lap" on the opening side, so that while each is rotated at the same time the same angular distance on its axis—one to close, the other to open, its duct or port—the closing of the one duct will be effected by the first half of the rotation of its valve, the other half being mere lap, while the opening of the other duct will be effected during the last half of the rotation of its valve, the first half merely working off the lap. In this way the air will be shut off the chamber before steam is admitted, and the steam will be shut off before admitting the air. While the tripper E is thus opening and closing the air and steam valves, it is also working the purge-valve P, as follows: On the top of the tripper two tappets, $e^1$ and $e^2$, are placed. One of these tappets, $e^1$, when the tripper E approaches the end of its air-stroke, meets the arm $p^7$ of the lever $p^6$, and, turning it, pulls the link-rod $p^5$, pivoted to the weighted lever $p^1$, below its center of motion. This turns the lever $p^1$ up to, and, say, five degrees past, the vertical at the instant the carriage reaches the end of the stroke, when the lever, by its gravitating force, is turned rapidly, causing a like movement of the levers and links connected with it, and opening the purge-valve P suddenly. When the tripper commences its steam-stroke, the arm $p^7$, which, on the terminal motion of the air-stroke, was thrown over, as described, against the tappet $e^2$, is now, by the advance of that tappet, thrown back again toward the tappet $e^1$, and shuts the purge-valve suddenly, soon after the steam-stroke is begun, by the reverse movement of the parts by which this valve was opened. When the tripper reaches the end of the steam-stroke the purge-valve P is opened from that end by the tappet $e^2$ striking the arm $p^4$ and turning the levers $p^3$ and $p^1$, which are connected by the link $p^2$, so as to open the purge-valve suddenly at the end of the air-stroke, and then, when the air-stroke begins, the tappet $e^1$, striking the arm $p^4$, will throw it back again, reversing the motion of the levers $p^3$ and $p^1$ and the link $p^2$, and close the purge-valve P very soon after the air-stroke begins.

The pivot or wrist pin of the lever $p^1$, which connects with the link-rod $p^5$, should be arranged in a slot, to allow it to be set nearer to, or farther from, the center of motion of the lever $p^1$; and the link $p^5$ should be made in two parts, adjustable by sliding on each other, to increase or diminish its length, to adapt it to the adjustment requisite for lengthening or shortening the time which the purge-valve is kept open. To the same end the distance of the tappets $e^1$ and $e^2$ from the center of the tripper may be made adjustable by either having a series of holes or a slot and set-screw on the carriage.

The arm $p^4$ is secured in its place on the bent end of the lever $p^3$ by means of a sleeve held by a set-screw, $p^8$.

The axes of motion of the levers $p^3$ and $p^6$ are inclined to the line of motion of the tripper, so that when either of the arms $p^4$ or $p^7$ is struck by a tappet of the tripper and turned it will be carried within the range of motion of the other tappet, that by it it may be met and thrown back again on the reverse motion of the tripper. The tappets move in parallel paths, arranged close together, that the angle thereto required in the motion of the arms to cross from one tappet to the other may be as small as practicable. While the tripper has thus been closing the air-valve, opening the steam-valve, opening the purge-valve, and closing the latter soon after the steam-valve opened, it has also, simultaneously with closing the purge-valve, opened the water-gas valve, through which the water-gas passes to the condenser and lime purifier on its way to the holder. This valve H will stand open until the steam-valve is shut at the end of the steam-stroke. On the side of the tripper two quadrant-shaped tappets, $h$ and $o$, are pivoted. One of them, $h$, gives motion to the water-gas valve H; the other, $o$, gives motion to the air-gas valve O. The water-gas valve H is opened and shut by the alternate movement to the right and left of the weighted lever $h^1$, which is connected below its center of motion by a link-rod, $h^2$, with a sliding bar, $h^3$, moving lengthwise in guides on the frame A, and having a stud, $h^4$, projecting upward from its end. Above its center of motion the lever $h^1$ is connected, by a link-rod, $h^5$, with another bar, $h^6$, sliding on the frame, and carrying an upright stud, $h^7$, on its end. When the tripper is nearly at the end of its air-stroke the tappet $h$, meeting the stud $h^4$, is turned on its pivot, rises at the side of the rail $r$, climbs over the stud, and drops down behind it. On commencing the steam-stroke the tripper presses the lower corner of the quadrant-tappet $h$ against the stud $h^4$, and the quadrant yields, turning on its pivot until one of its radial edges is parallel with the under side of the rail $r$, with the small arm on its corner projecting under and bearing against the under side of the rail, to prevent the quadrant from turning any farther upward, or yielding farther to the resistance offered by the stud $o^4$; consequently the continued movement of the tripper pushes the stud forward, the rail holding the quadrant to its work until the stud has moved far enough to turn the lever $h^1$ to the point at which the preponderance of its weight causes it suddenly to jump forward and open the water-gas valve. The small arm of the quadrant by this time having passed beyond the end of the rail $r$, there is no longer anything to hold the quadrant down against the stud, and it, therefore, turns up behind as the tripper moves on, climbs over, and drops in front of the stud. The movement just described of the stud $h^4$ and the weighted lever $o^1$, through the intervention of a link and sliding bar, brings the stud $o^9$ at the opposite end of the machine into the proper position to be in its turn, in like manner, pushed by the quadrant to reverse the action of the parts, and close the water-gas valve at the end of the steam-stroke. The quadrant, at this end of the stroke, is held to its work against the stud $h^7$, while pushing it by the under side of the rail $r'$, against which the little arm slides, as it did along the rail $r$. The lap of the water-gas valve, on its opening side, is such that it does not open its port until the instant the port of the purge-valve closes.

The air-gas valve O is opened simultaneously with the closing of the purge-valve on the air-stroke of the tripper, and it is closed simultaneously with the air-valve. This valve is opened and shut by the tripping of the weighted lever $o^1$. The end of this lever, below its center of oscillation, is connected, by a link-rod, $o^2$, with a bar, $o^3$, that slides endwise in guides on the frame, and carries at its end an upright stud, $o^4$. Above its center of oscillation the lever is connected, by a link-rod, with a pendulum-lever, $o^6$, pivoted to the frame G. The foot of this pendulum-lever is forked, so as to embrace an upright driving-pin, $o^7$, on the end of the sliding bar $o^8$, which moves lengthwise in guides on the frame, and carries an upright stud, $o^9$, near its middle. The two studs $o^4$ $o^9$ are in the path of motion of the hinged quadrant-tappet $h$, and when the tripper is approaching the end of the steam-stroke, the quadrant $o$ comes in contact with the stud $o^9$, turns up to climb over, and drops down behind it. On the return of the tripper on the air-stroke, the quadrant is borne against the stud $o^9$, turns until its arm bears against the under side of the rail $r'$, then pushes the stud before it until, at the moment of closing the purge on this stroke, the air-gas valve O is suddenly opened by the action of the weighted lever $o^1$. The quadrant, having moved away from the rail $r'$, climbs over the stud $o^9$, and passes on to the other end of the stroke, nearing which it comes in contact with the stud $o^4$, and, bearing against it and the rail $r$, pushes the stud before it, and through it turns the weighted lever $o^1$ until, at the end of the stroke, it overbalances and shuts the air-gas valve simultaneously with the opening of the purge and steam valves.

The rails $r$ $r'$ are common to the quadrant pendulum-tappets $h$ and $o$, the space between the sides of the quadrants being somewhat wider than the rail, to permit that corner and edge of each quadrant which does not carry the short arm to turn up and down by the side of the rail, for the purpose of climbing over the studs. The arm on one quadrant must be on the diagonally-opposite corner from that on the other, as represented in Figs. 18, 19, and 20. The length of the short arm should be such that it will reach nearly, but not quite, half-way across the rail.

I have not shown or described the pinions which would usually be placed on the pivots of the weighted levers, nor the toothed racks by which they would, in that case, be connected with pinions on the cylindrical valves below, as such things are too well known to require description in detail, and will be varied in construction and arrangement, or substituted by other devices by constructers of gas-machinery to suit their own views, or to adapt them to different kinds of valves and generators, and the various arrangements of machinery which are made to suit the conditions of different gas-works. Neither have I pointed out how the valves of two or more generators might readily be connected with, and worked by, one automatic machine; for although such connection would lessen the first cost, it is more simple and easy to keep a generator working properly when fitted with its own automatic valve-worker. I have also omitted to point out how the automaton could be mounted in an independent frame far enough above the top of the generator to be out of the way of the feeding-hopper and valves, where it could be inclosed in a tight case, to protect it from dust and vapor.

The conditions necessary to the automatic working of the valves of a gas-generator having been pointed out, and the construction in detail of an automaton for that purpose shown, it will be easy for persons skilled in the art to substitute for the screw and tripper a worm-wheel and screw, and rotating cams and weights, or springs, or otherwise to modify the mechanism here described, or to substitute therefor, or for any part of it, equivalent mechanical movements, either to adapt it to varying conditions of gas-making or to different generators, having valves which require regular working.

The purging process may, with great advantage, be made in generating-chambers whose valves are worked by hand, although to obtain the best effect the purging should be done automatically.

If, to utilize the gases discharged in purging, they are gathered into a holder with the air-gas, or conducted directly to the furnace of a steam-boiler or a retort to be burned, in connection with air-gas or solid fuel, to generate heat, it should be found that the puffs caused by the slight explosions of the purge render the combustion of the air-gas with which it may be mingled too unsteady, or otherwise prevent the efficient working of the furnace, or if it should strain or cause inconvenient pulsations in the holders or furnaces, it may in such cases, or in any other in which it cannot for any reason be advantageously employed as auxiliary fuel, be wasted by discharge into the atmosphere through a pipe connected with the purge-valve.

If in any case it should be desirable to operate a portion of the valves by hand, leaving the machine to work the rest, the machine would, even in such a case, be a useful auxiliary.

What I claim as my invention is—

1. The combination of a gas-generator with automatic mechanism, substantially as described, for working its valves, or some of them, to admit in alternate succession two or more different gases or vapors, or mixtures thereof, and distribute and discharge their products, substantially as described.

2. The process of purging the generating-chamber, by expelling therefrom one kind of gas before the admission of another, substantially as described.

3. The combination, in gas-generators, of the purge-valve with the steam-valve, substantially as described.

4. The combination, in gas-generators, of the purge-valve with the air-valve, substantially as described.

5. The method of preventing contamination of the water-gas by air-gas, by constructing and working the valves substantially as described, so that the valve admitting air shall remain shut until the instant at which the port of the water-gas valve closes, and the port of the water-gas valve shall remain shut until the instant at which the contaminating gas is removed from the generator, substantially as described.

E. STERN.

Witnesses:
 ERAZM J. JERZMANOWSKI,
 P. H. WATSON.